United States Patent
Björklund

(10) Patent No.: US 7,000,758 B2
(45) Date of Patent: Feb. 21, 2006

(54) CONVEYOR SYSTEM

(75) Inventor: Karl-Gustav Björklund, Bollnäs (SE)

(73) Assignee: Bruks AB, Arbra (SE)

( * ) Notice: Subject to any disclaimer, the term of this patent is extended or adjusted under 35 U.S.C. 154(b) by 0 days.

(21) Appl. No.: 10/815,498

(22) Filed: Apr. 1, 2004

(65) Prior Publication Data
US 2005/0217973 A1 Oct. 6, 2005

(51) Int. Cl.
B65G 19/16 (2006.01)
(52) U.S. Cl. .............. 198/716; 198/808; 198/821
(58) Field of Classification Search ........... 198/716, 198/808, 819, 820, 821
See application file for complete search history.

(56) References Cited

U.S. PATENT DOCUMENTS

| | | | |
|---|---|---|---|
| 3,586,168 A * | 6/1971 | Osheff et al. ............... | 209/549 |
| 3,595,378 A * | 7/1971 | Kamisaka ................... | 198/819 |
| 4,402,395 A * | 9/1983 | Hashimoto ................. | 198/807 |
| 4,984,681 A | 1/1991 | Jonkers ...................... | 198/811 |
| 5,645,157 A | 7/1997 | Kitano et al. .............. | 198/811 |
| 6,102,195 A * | 8/2000 | Weikel ....................... | 198/808 |
| 6,170,644 B1 | 1/2001 | Nakaegawa et al. ........ | 198/811 |
| 6,170,646 B1 | 1/2001 | Kaeb et al. ................. | 198/821 |
| 6,360,878 B1 | 3/2002 | Deal et al. .................. | 198/819 |
| 2002/0043448 A1 | 4/2002 | Peltier et al. ............... | 198/618 |
| 2002/0139643 A1 | 10/2002 | Peltier et al. ............... | 198/821 |

FOREIGN PATENT DOCUMENTS

| | | |
|---|---|---|
| EP | 0 992 440 | 4/2000 |
| GB | 0887698 A | 1/1962 |
| GB | 1239372 A | 7/1971 |
| GB | 2136380 A | 9/1984 |
| JP | 60036209 A | 2/1985 |
| JP | 6064729 A | 3/1994 |
| JP | 9169418 A | 6/1997 |
| JP | 9267906 A | 10/1997 |

* cited by examiner

Primary Examiner—Gene O. Crawford
Assistant Examiner—Mark A. Deuble
(74) Attorney, Agent, or Firm—Needle & Rosenberg, PC

(57) ABSTRACT

A conveyor system comprising an endless conveyor belt (5) having a plurality of mechanical conveyor means (12) projecting from a top surface thereof and a delivery tube (1) having an intake end and a discharge end for receiving a delivery portion of the endless belt and a return tube (10) extending along the delivery tube for receiving a return portion of the endless belt. A drive assembly (6, 7) is mechanically connected to the endless belt for rotating it for moving it in the tubes. Means (9) are arranged to guide the endless belt into the return tube with a bottom surface (14) of the belt following at least the upper portion of the return tube when moving through the return tube. The return tube is designed and dimensioned with respect to the width of said belt so as to support transversal end portions of the belt by return tube portions from below when the belt moves through the return tube while following the upper portion thereof.

12 Claims, 3 Drawing Sheets

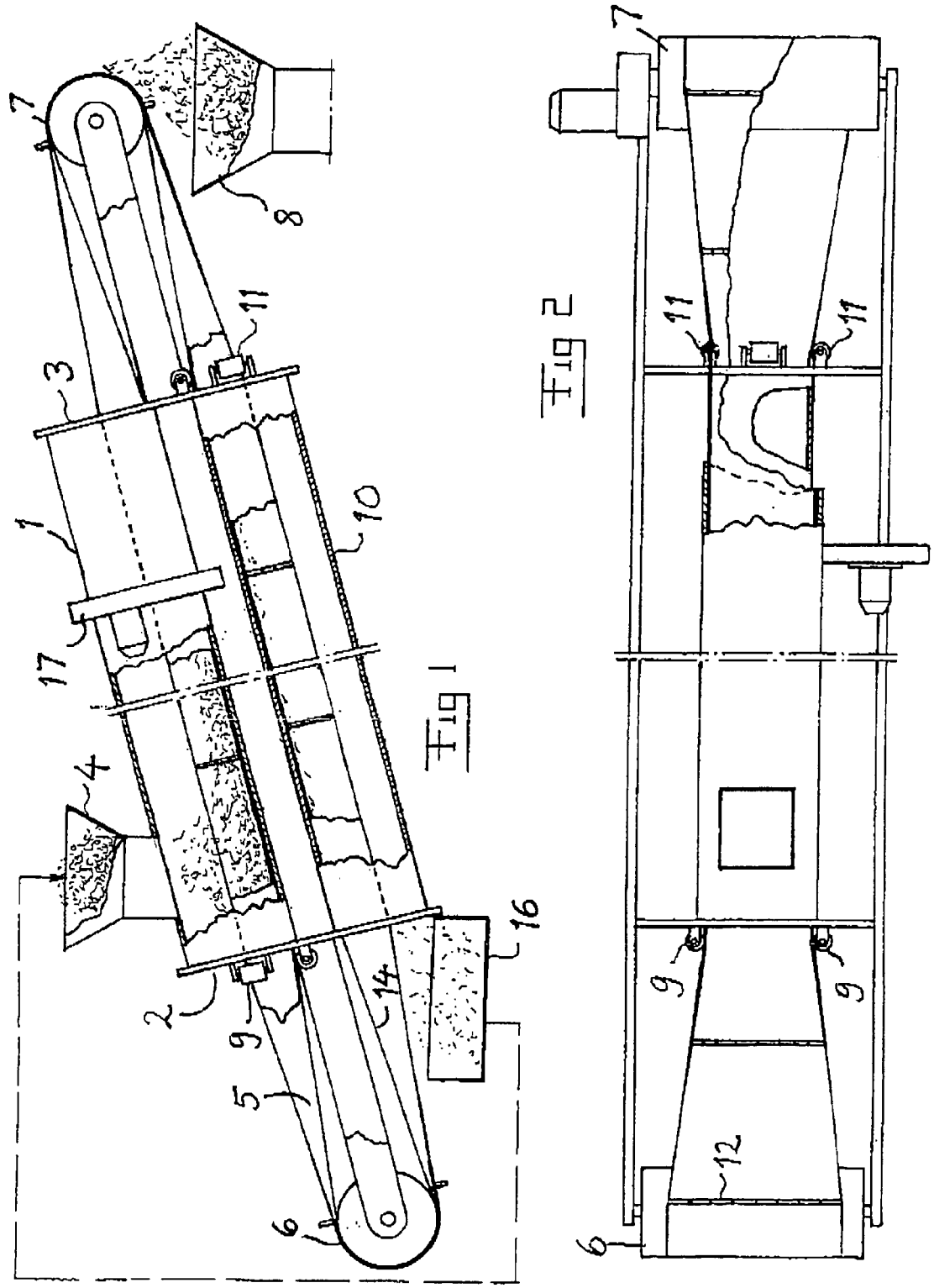

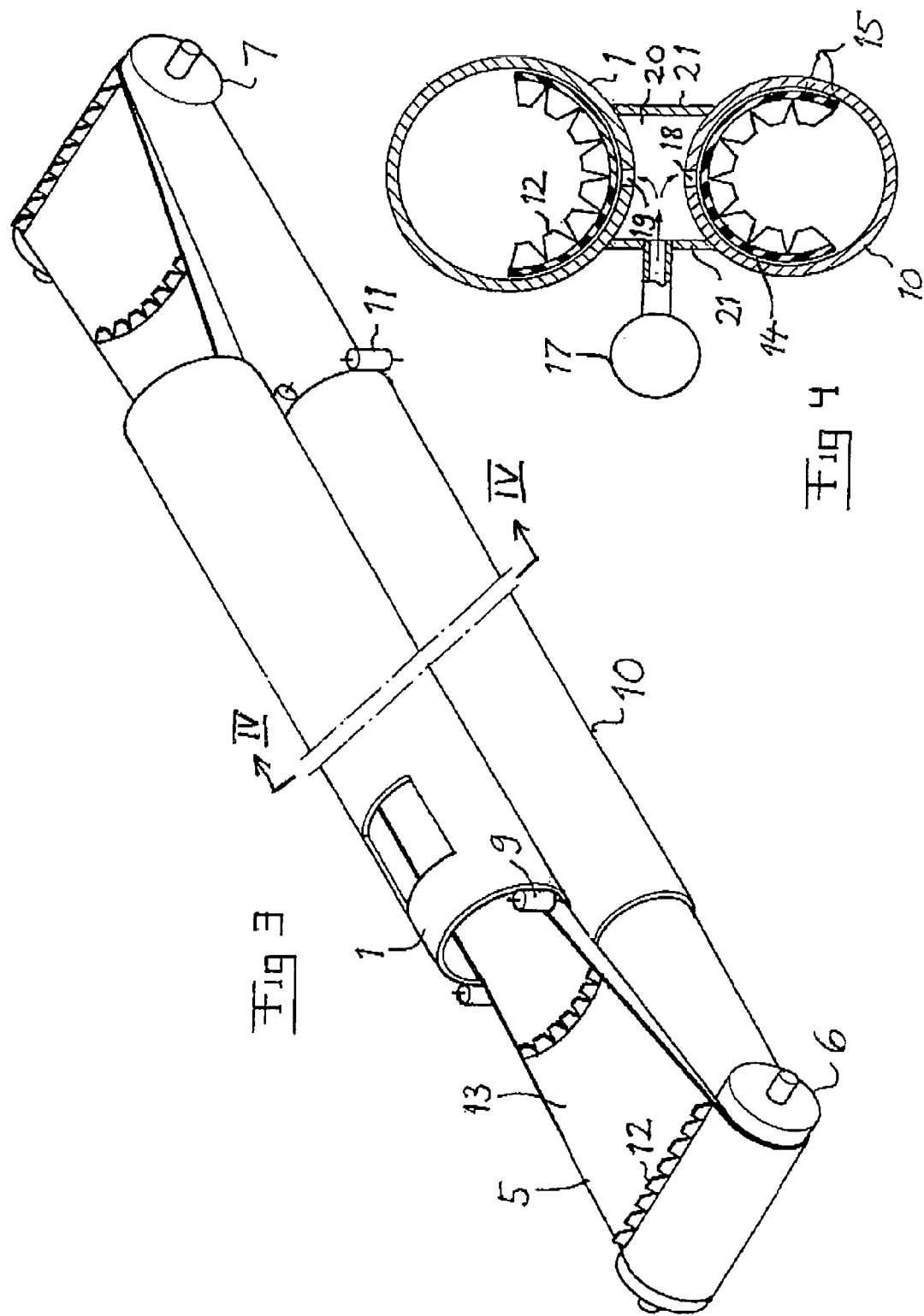

CONVEYOR SYSTEM

BACKGROUND OF THE INVENTION

1. Field of the Invention

The present invention relates to a conveyor system comprising a delivery tube having an intake end, a discharge end, an endless conveyor belt having a top surface and a bottom surface, wherein a delivery portion of said endless belt is positioned within said tube and wherein a return portion of said endless belt is positioned outside said tube, a drive assembly mechanically connected to said endless belt for rotating said endless belt for moving it in said tube from the intake to the discharge end, and a plurality of mechanical conveyor means projecting from said top surface of said endless belt.

Such a conveyor system may be used for transporting different types of materials, especially bulk materials such as chips, cement, gravel and other type of solid material from the location of said intake end to the location of said discharge end of the delivery tube.

The conveyor system may be used within industrial plants, such as in paper mills, as well as on the field, for instance in or in connection to mines. The conveyor system may be stationary as well as mobile.

The distance between said two locations may be arbitrary, but it is often in the region of 20 meters to 300 meters.

An advantage of a conveyor system having a delivery tube for the transport of the endless conveyor built therein is that the level of noise generated thereby is much lower than for a conveyor system with an open path for the conveyor belt, such as a conventional conveyor, for example a scraper conveyor or reclaiming scraper.

Furthermore, the arrangement of said plurality of mechanical conveyor means projecting from said top surface of the endless belt improves the possibilities to efficiently transport material by the conveyor system from one location to another location at a higher level than the former. Thus, a conveyor system of this type is suitable to be used as a reclaiming scraper while inclining the delivery tube.

Said plurality of mechanical conveyor means may have various appearances adapted to the nature of the material to be transported, such as for example having a paddle-like character.

2. Description of the Prior Art

A conveyor system of the type mentioned in the introduction is already known through U.S. patent application publication No. 2002/0139643 A1. Although such a conveyor system functions well when used to transport material between two locations located at different levels, it has some disadvantages.

In a conveyor system of this type having an endless belt provided with said mechanical conveyor means it is for the transport of some materials not possible to efficiently remove all the material from the endless belt at said discharge end of the delivery tube by means of brushes or the like, but some material will adhere to the belt when turning into said return portion. Furthermore, such material not removed from the endless belt will as a consequence of the gravitation and possible vibrations of the belt fall down from said return portion when the belt is moved towards said intake end, which under certain circumstances may result in a not neglectable loss of material.

SUMMARY OF THE INVENTION

The object of the present invention is to provide a conveyor system of the type defined in the introduction, which finds a remedy to said inconvenience of the conveyor system discussed above.

This object is according to the invention obtained by providing such a conveyor system with a return tube extending along the delivery tube for receiving said return portion of said endless belt, and means adapted to guide said endless belt into said return tube with the bottom surface of the belt following at least the upper portion of the return tube when moving through the return tube and by arranging a return tube designed and dimensioned with respect to the width of said belt so as to support transversal end portions of the belt by return tube portions from below when the belt moves through the return tube while following the upper portion thereof.

By providing said guide means it is possible to move said endless belt inside a tube back to the location of said intake end of the delivery tube in spite of the presence of the conveyor means projecting from the top surface of the endless belt, since the belt will in this way be moved with the bottom surface thereof under and following the "ceiling" of the tube with the conveyor means projecting inwardly. This is possible by the fact that the return tube is designed and dimensioned with respect to the width of said belt so as to support transversal end portions of the belt by return tube portions, and by that prevent the endless belt to be bent downwardly through the influence of the gravity.

This means that any material remaining on the endless belt after passing said discharge end of the delivery tube and falling down from said return portion of the endless belt will be collected by said return tube and not lost. An additional advantage of the conveyor system according to the invention is that the transport of the endless belt inside said return tube will reduce the noise level further with respect to conveyor systems already known.

Furthermore, another advantage of using a tube for returning the endless belt with respect to the use of a flat plate as in the conveyor system of said US patent application publication is that the endless belt will be self-centering, so that it will be possible to guide the endless belt back along a path including curves.

According to an embodiment of the invention said return tube has a substantially circular cross-section and an inner perimeter exceeding the width of said endless belt but being less than twice said width. This is a preferred and easy way to obtain a transport of the belt in the return tube while following the "ceiling" of that tube.

According to another embodiment of the invention being a further development of the previous embodiment said return tube has an inner perimeter being less than 180 percent of the width of said endless belt. It has turned out that such a relationship between the inner perimeter of the return tube and the width of the endless belt reliably ensures that the endless belt will after being guided by said guide means follow the upper portion of the return tube while travelling through the return tube.

According to another embodiment of the invention said return tube has an inner perimeter being less than 140 percent of the width of said endless belt, and according to a still further embodiment of the invention the return tube has an inner perimeter being less than 120 percent of the width of the endless belt. It is even possible to have the inner perimeter of the return tube slightly exceeding the width of the endless belt, so that the return tube does not only collect material falling down from the belt, but such material located on the bottom of the return tube will also be influenced by the conveyor means and transported therethrough to the end of the return tube close to the intake end of the delivery tube. This material may then by appropriate means be recirculated to the intake end of the delivery tube for being fed to the discharge end thereof. The relationship of the perimeter of the return tube and the width of the endless belt required for obtaining such returning of material falling down in the return tube will depend upon the nature of the material to be transported by the conveyor system.

According to another embodiment of the invention said return tube is arranged below said delivery tube, which makes it possible to have a simple and cost-efficient design of said guide means.

According to another embodiment of the invention the conveyor system further comprises means adapted to blow air into the return tube at locations to be covered by the bottom surface of said endless belt for reducing the friction between the internal walls of the return tube and at least one portion of said endless belt while travelling through the return tube. This reduces the consumption of power for feeding the endless belt through the return tube. The same is obtained by arranging means adapted to blow air into the delivery tube at locations to be covered by the bottom surface of said endless belt for reducing the friction from the internal walls of the delivery tube on the bottom surface of the endless belt when travelling through the delivery tube. It is pointed out that the same air blowing means may be used for both the return tube and the delivery tube, but a higher pressure of the air blown into the delivery tube would mostly be appropriate, since the endless belt is in the delivery tube influenced by the gravitation and also by material resting thereon towards internal bottom walls of the delivery tube, while the gravitation will even assist said air to reduce the friction between internal walls of the return tube and most portions of the endless belt in the return tube.

The invention also relates to a use of a conveyor system as defined above for transporting bulk material, and especially transporting material over a distance of 20 meters to 300 meters.

Further advantages and features of the invention will appear from the following description and the other dependent claims.

BRIEF DESCRIPTION OF THE DRAWINGS

With reference to the appended drawings, below follows a specific description of preferred embodiments of the invention cited as examples.

In the drawings:

FIG. 1 is a partially sectioned simplified side elevation of a conveyor system according to an embodiment of the present invention, FIG. 2 is a view from above of the conveyor system according to FIG. 1, FIG. 3 is a simplified schematic perspective view of a part of the conveyor system according to FIG. 1, FIG. 4 is a schematic cross section view taken along the lines IV—IV in FIG. 3.

DETAILED DESCRIPTION OF PREFERRED EMBODIMENTS OF THE PRESENT INVENTION

Figure 5:
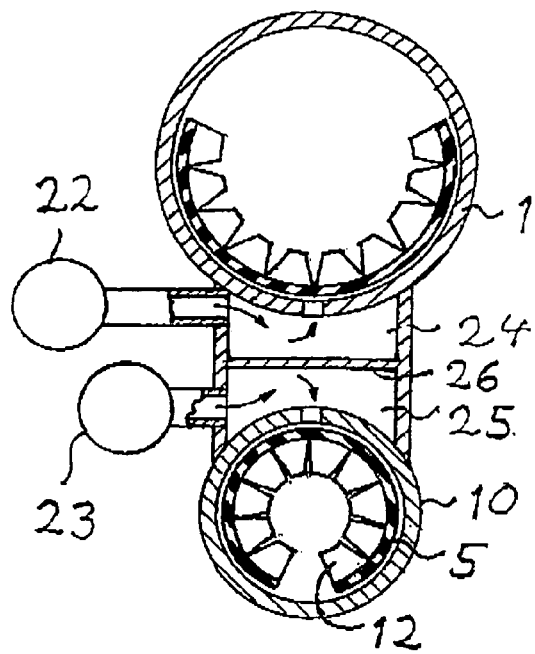
FIG. 5 is a view corresponding to FIG. 4 of a conveyor system according to another embodiment of the invention.

A conveyor system according to the present invention for transporting bulk material is very schematically illustrated in FIG. 1. The system comprises a delivery tube 1 having an intake end 2 and a discharge end 3. The length of this tube may be 20–300 meters, but the invention is not restricted to this range, and only the two ends thereof are for that sake shown in the Figure. A typical diameter of the tube is 300–1000 millimeters. A member, such as a funnel 4 is arranged at the intake end of the delivery tube supplying bulk material to be fed towards said discharge end to an endless conveyor belt 5.

The conveyor system also comprises a drive assembly in the form of two pulleys 6, 7 around which the endless conveyor belt 5 is arranged for moving the endless belt by rotating the pulleys.

A collecting funnel 8 is arranged at the discharge end of the delivery tube 1 for collecting material transported by the endless belt to this location. The location of the discharge end of the delivery tube is at a higher level than the location of the intake end thereof.

Reference is now also made to FIG. 2 and 3. The conveyor system also comprises first guide means in the form of rollers 9 arranged at the intake end 2 of the delivery tube 1 for laterally influencing the longitudinal edges of the conveyor belt for guiding it into the delivery tube with the bottom surface of the belt following the lower portions of the delivery tube 1 when moving through this tube. It is shown that the width of the conveyor belt 5 clearly exceeds the diameter of the delivery tube 1.

The conveyor system also comprises a return tube 10 arranged below the delivery tube and extending substantially in parallel therewith for receiving a return portion of the endless belt after being diverted by the discharge end pulley 7.

Second guide means in the form of rollers 11 are arranged at the entrance of the return tube 10 for laterally influencing the longitudinal edges of the conveyor belt to be bent to follow at least the upper portion of the return tube when moving therethrough.

The conveyor belt is provided with a plurality of mechanical conveyor means 12 projecting from the top surface 13 of the conveyor belt and arranged in rows spaced in the longitudinal direction of the belt. These conveyor means are arranged for making it possible to efficiently feed material through the delivery tube 1 also when the inclination thereof with respect to the horizontal is substantial, for example defined by an angle above 15°. Thanks to the arrangement of said second guide means 11 the return portion of the conveyor belt may also move in a tube, since the conveyor belt will follow walls of this tube with the bottom surface 14 thereof.

The return tube has as shown in FIGS. 4 and 5 an inner perimeter exceeding the width of the endless belt but being less than twice said width, which means that portions near the longitudinal edges of the belt will follow internal walls 15 of the return tube having a normal thereto with a component in the vertical direction upwardly, for preventing the belt from collapsing and falling down inside the return tube 10 with the conveyor means 12 onto the bottom thereof. This relationship may preferably be achieved by arranging a return tube having a smaller diameter than the delivery tube, but this is not a requirement.

Material left on the belt and falling down therefrom when the belt is travelling through the return tube may be collected by the return tube 10 and through a combination of gravitation and the conveyor means 12 be transported to a collector means 16 at the end of the return tube located at the intake end of the delivery tube for being recirculated to the funnel 4 for being fed to the discharge end of the delivery tube.

The conveyor system also comprises means 17 (see FIG. 4) adapted to blow air into the return tube 10 at locations to be covered by the bottom surface of the endless belt for reducing the friction between the internal walls of the return tube and the endless belt while travelling through the return tube. It is indicated in FIG. 4 how this is achieved by arranging holes 18 through the wall of the return tube at the top thereof. Such holes may be arranged in a row along the entire return tube at an interval of for example 300 millimeters and with a diameter of a couple of millimeters. Accordingly, an air cushion is produced between the bottom surface 14 of the conveyor belt and the walls of the return tube reducing friction and by that power losses.

The conveyor system according to the invention also comprises means adapted to blow air into the delivery tube at locations to be covered by the bottom surface 14 of the endless belt for reducing the friction from the internal walls of the delivery tube on the bottom surface of the endless belt when travelling through the delivery tube. This means comprises in the embodiment according to FIG. 4 the same means or fan 17 as for blowing air into the return tube, and a corresponding longitudinal row of holes 19 are formed in the bottom of the delivery tube. The holes 18 and 19 in the two tubes communicate with a sealed space 20 in common defined by vertical walls 21 extending between the two tubes.

The embodiment schematically shown in FIG. 5 differs from the one according to FIG. 4 by the fact that the delivery tube and the return are provided with separate air blowing means 22, 23 and that the space 20 is divided into two separate spaces 24, 25 through a longitudinal, substantially horizontal wall 26. This means that the pressure of the air supplied to the respective tube for reducing friction may be independently controlled. In some cases a higher air pressure is desired for the delivery tube, since the air cushion formed between the belt and that tube has to act against the gravitation, and the belt may in this tube also have a considerable load due to the material transported thereon. In this case it is also possible to adjust the supply of air to the delivery tube to different materials with different densities transported thereby without influencing the supply of air to the return tube.

This embodiment also differs from the one according to FIG. 4 by the fact that the relationship of the perimeter of the return tube 10 and the width of the endless conveyor belt 5 is changed, so that said perimeter is only slightly larger than said width. This means that material falling down from the endless belt when this moves through the return tube may be influenced by the conveyor means 12 to be moved back to the region of the intake end of the delivery tube for being collected by the collector means 16 (see FIG. 1).

Figure 6:
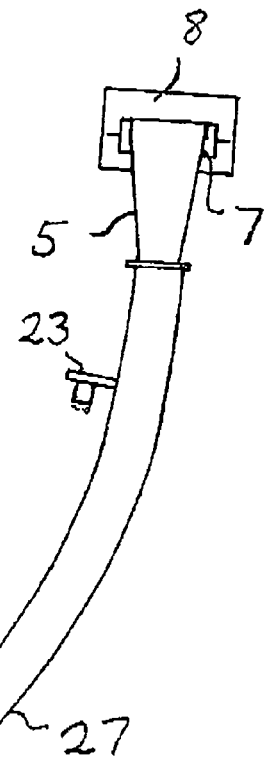
FIG. 6 is a simplified view from above of a conveyor system according to another embodiment of the invention.

FIG. 6 schematically illustrates the possibility to transport material through a curve through the conveyor system according to the invention by arranging a curved portion 27 on the two tubes. This is possible thanks to the fact that the endless conveyor belt travels through tubes between the two diverting pulleys 6, 7 so that the belt will be self-centering in the tubes.

The invention is of course not in any way restricted to the embodiments described above, but many possibilities to modifications thereof would be apparent to a person with ordinary skill in the art without departing from the basic idea of the invention as defined in the appended claims.

For the embodiment with a return tube having a circular cross-section completely other relationships between the diameters of the two tubes and between the width of the endless conveyor belt and these diameters are envisagable as long as the perimeter of the return tube is less than twice said width.

The delivery tube and the return tube are shown in the illustrated embodiments as being substantially circular in cross-section. However, in other embodiments, the tubes may be formed in other cross-sections, such as oval, octagon, or other geometric shapes according to the preference and needs of the user.

The projecting conveyor means may also have any other appearance than the one shown in the Figures, and these may even be formed by a roughness with small peaks and valleys distributed over the entire or portions of the top surface of the conveyor belt and making it impossible to let the conveyor belt rest on any surface, such as internal walls, of a tube through this top surface. A plurality of nails is another possible type of projecting conveyor means, which may be suitable for some type of bulk material. "mechanical conveyor means projecting" is intended to comprise all types of conveyor means mechanically influencing the material resting on the conveyor belt for excluding conveyor means influencing this material purely through magnetism, electricity or other binding forces.

Although it is very simple to arrange the return tube below the delivery tube, it is well possible to arrange them on the same level or even the return tube above the delivery tube by a suitable arrangement of said guide means so as to obtain a guiding of the endless belt into the return tube with the bottom surface of the belt following at least the upper portion of the return tube when moving therethrough.

Furthermore, the length and circumference information concerning the delivery tube and the return tube set forth herein is provided by way of example only. The user may select any length and circumference that is practical and suitable for the intended application.

Moreover, the location of the discharge end of the delivery tube has not to be on a higher level than the location of the intake end thereof, but it may be on the same level or even at a lower level.

The guide means may have another suitable structure than rollers.

"A return tube extending along the delivery tube" is to be interpreted broadly, and it is not necessary that the return tube extends substantially in parallel with the delivery tube, but the extension thereof has to be so that the endless belt may conveniently be led through the two tubes while fulfilling the tasks in each individual application.

It is not necessary that the conveyor system comprises means adapted to blow air into the delivery tube as disclosed above.

What is claimed is:

1. A conveyor system, comprising:
   a delivery tube having an intake end and a discharge end,
   an endless conveyor belt having a top surface and a bottom surface, wherein a delivery portion of said endless belt is positioned within said tube and wherein a return portion of said endless belt is positioned outside said tube, a drive assembly mechanically connected to said endless belt for rotating said endless belt for moving it in said tube from the intake to the discharge end, and a plurality of mechanical conveyor means projecting from said top surface of said endless belt, wherein the conveyor system also comprises:

a return tube extending along the delivery tube for receiving said return portion of said endless belt wherein said return tube has a substantially circular cross-section and an inner perimeter exceeding the width of said endless belt but being less than twice said width, and means adapted to guide said endless belt into said return tube with the bottom surface of the belt following at least the upper portion of the return tube when moving through the return tube, wherein said return tube is designed and dimensioned with respect to the width of said belt so as to support transversal end portions of the belt by return tube portions from below when the belt moves through the return tube while following the upper portion thereof, and wherein said return tube has an inner perimeter being less than 180 percent of the width of said endless belt.

2. The conveyor system of claim 1, the return tube further comprising an inner diameter, and the delivery tube further comprising an inner diameter, wherein the inner diameter of the return tube is smaller than the inner diameter of the delivery tube.

3. The conveyor system of claim 1, wherein said return tube is arranged below said delivery tube.

4. The conveyor system of claim 1, wherein it further comprises means adapted to blow air into the return tube at locations to be covered by the bottom surface of said endless belt for reducing the friction between the internal walls of the return tube and at least one portion of said endless belt while travelling through the return tube.

5. The conveyor system of claim 1, wherein it further comprises means adapted to blow air into the delivery tube at locations to be covered by the bottom surface of said endless belt for reducing the friction from the internal walls of the delivery tube on the bottom surface of said endless belt when travelling through the delivery tube.

6. The conveyor system of claim 1, wherein said conveyor means are arranged on said top surface of the endless belt in transversal rows spaced in the longitudinal direction of the belt.

7. The conveyor system of claim 1, wherein said conveyor means are adapted to push material located on said top surface of said endless belt downstream thereof as seen in the feeding direction of said endless belt from the intake end to the discharge end of the delivery tube.

8. The conveyor system of claim 1, wherein said delivery tube is adapted to be arranged with said discharge end at a higher level than said intake end.

9. The conveyor system of claim 1, wherein the delivery tube or the return tube has a longitudinal extension including at least one curved portion.

10. The conveyor system of claim 1, wherein the delivery tube and the return tube have a longitudinal extension including at least one curved portion.

11. A conveyor system, comprising:

a delivery tube having an intake end and a discharge end, an endless conveyor belt having a top surface and a bottom surface, wherein a delivery portion of said endless belt is positioned within said tube and wherein a return portion of said endless belt is positioned outside said tube, a drive assembly mechanically connected to said endless belt for rotating said endless belt for moving it in said tube from the intake to the discharge end, and a plurality of mechanical conveyor means projecting from said top surface of said endless belt, wherein the conveyor system also comprises:

a return tube extending along the delivery tube for receiving said return portion of said endless belt wherein said return tube has a substantially circular cross-section and an inner perimeter exceeding the width of said endless belt but being less than twice said width, and means adapted to guide said endless belt into said return tube with the bottom surface of the belt following at least the upper portion of the return tube when moving through the return tube, wherein said return tube is designed and dimensioned with respect to the width of said belt so as to support transversal end portions of the belt by return tube portions from below when the belt moves through the return tube while following the upper portion thereof, and wherein said return tube has an inner perimeter being less than 140 percent of the width of said endless belt.

12. A conveyor system, comprising:

a delivery tube having an intake end and a discharge end, an endless conveyor belt having a top surface and a bottom surface, wherein a delivery portion of said endless belt is positioned within said tube and wherein a return portion of said endless belt is positioned outside said tube, a drive assembly mechanically connected to said endless belt for rotating said endless belt for moving it in said tube from the intake to the discharge end, and a plurality of mechanical conveyor means projecting from said top surface of said endless belt, wherein the conveyor system also comprises:

a return tube extending along the delivery tube for receiving said return portion of said endless belt wherein said return tube has a substantially circular cross-section and an inner perimeter exceeding the width of said endless belt but being less than twice said width, and means adapted to guide said endless belt into said return tube with the bottom surface of the belt following at least the upper portion of the return tube when moving through the return tube, wherein said return tube is designed and dimensioned with respect to the width of said belt so as to support transversal end portions of the belt by return tube portions from below when the belt moves through the return tube while following the upper portion thereof, and wherein said return tube has an inner perimeter being less than 120 percent of the width of said endless belt.

* * * * *